US012579276B2

(12) United States Patent
Kulshreshtha et al.

(10) Patent No.: US 12,579,276 B2
(45) Date of Patent: Mar. 17, 2026

(54) APPLICATION VULNERABILITY SCORE BASED ON STACK TRACES

(71) Applicant: Cisco Technology, Inc., San Jose, CA (US)

(72) Inventors: Ashutosh Kulshreshtha, Cupertino, CA (US); Walter T. Hulick, Jr., Pearland, TX (US); Chandra Mohan Babu Nadiminti, Dublin, CA (US)

(73) Assignee: Cisco Technology, Inc., San Jose, CA (US)

( * ) Notice: Subject to any disclaimer, the term of this patent is extended or adjusted under 35 U.S.C. 154(b) by 308 days.

(21) Appl. No.: 17/835,074

(22) Filed: Jun. 8, 2022

(65) Prior Publication Data

US 2023/0252162 A1 Aug. 10, 2023

Related U.S. Application Data

(60) Provisional application No. 63/308,681, filed on Feb. 10, 2022.

(51) Int. Cl.
*G06F 21/57* (2013.01)
*G06F 21/52* (2013.01)

(52) U.S. Cl.
CPC ............ *G06F 21/577* (2013.01); *G06F 21/52* (2013.01); *G06F 2221/033* (2013.01)

(58) Field of Classification Search
CPC .............................. G06F 21/577; G06F 21/52
See application file for complete search history.

(56) References Cited

U.S. PATENT DOCUMENTS

| | | | |
|---|---|---|---|
| 10,019,572 B1 * | 7/2018 | Sharifi Mehr | .......... G06F 21/52 |
| 10,868,825 B1 * | 12/2020 | Dominessy | .......... H04L 43/045 |
| 11,042,647 B1 | 6/2021 | Joyce et al. | |
| 2010/0095157 A1 * | 4/2010 | Aoyama | ............. G06F 11/0778 |
| | | | 714/E11.029 |

(Continued)

FOREIGN PATENT DOCUMENTS

CN          113076541 A          7/2021

OTHER PUBLICATIONS

Jidiga, Goverdhan Reddy; Sammulal, P.; "Anomaly detection using smart tracing tricks on call stack," International Conference for Convergence for Technology, Pune, India, Apr. 6-8, 2014, IEEE, pp. 1-6.*

*Primary Examiner* — Victor Lesniewski
(74) *Attorney, Agent, or Firm* — Baker Botts L.L.P.

(57) ABSTRACT

A computing system for identifying and scoring problems associated with call stacks. The computing system identifies call stacks associated with an application and determines a problem occurs in the application. The computer system compares a call stack of a first set of applications with a call stack of a second set of applications, wherein the call stack of the first set of applications includes the problem and the call stack of the second set of applications does not include the problem. The computer system generates a score indicating a likelihood that a particular call stack caused the problem based on whether the particular call stack is included in the call stack of the first set of applications, the call stack of the second set of applications, or both. The computing system generates a notification comprising the score indicating the likelihood that the particular call stack caused the problem.

20 Claims, 3 Drawing Sheets

(56)          References Cited

U.S. PATENT DOCUMENTS

| | | | | |
|---|---|---|---|---|
| 2010/0153785 | A1* | 6/2010 | Keromytis | G06F 21/566 |
| | | | | 714/38.11 |
| 2013/0080502 | A1* | 3/2013 | Mccoll | G06F 11/0715 |
| | | | | 709/224 |
| 2015/0237063 | A1 | 8/2015 | Cotton et al. | |
| 2016/0300060 | A1* | 10/2016 | Pike | G06F 21/52 |
| 2017/0046518 | A1* | 2/2017 | Chen | G06F 21/566 |
| 2017/0124319 | A1* | 5/2017 | Peleg | G06N 3/006 |
| 2017/0161498 | A1* | 6/2017 | Yavo | G06F 21/566 |
| 2019/0121985 | A1* | 4/2019 | Hoole | G06F 11/362 |
| 2019/0196937 | A1* | 6/2019 | Wang | H04L 43/022 |
| 2020/0167271 | A1* | 5/2020 | Zhang | G06N 5/022 |
| 2020/0210580 | A1* | 7/2020 | Strogov | G06N 20/20 |
| 2020/0311268 | A1* | 10/2020 | Kostyushko | G06F 21/561 |
| 2020/0342113 | A1 | 10/2020 | Yi et al. | |
| 2020/0349259 | A1* | 11/2020 | Tsai | G06F 21/562 |
| 2021/0011717 | A1* | 1/2021 | Lin | G06F 11/366 |
| 2021/0049265 | A1* | 2/2021 | Pescatore | G06F 8/433 |
| 2021/0157924 | A1* | 5/2021 | Antoniadis | G06F 11/3612 |
| 2021/0173760 | A1* | 6/2021 | Downie | G06F 11/3698 |
| 2021/0216643 | A1 | 7/2021 | Mishra et al. | |
| 2021/0263924 | A1* | 8/2021 | Klein | G06F 16/2462 |
| 2021/0326446 | A1* | 10/2021 | Cao | G06F 11/3636 |
| 2023/0281322 | A1* | 9/2023 | Powers | G06F 21/577 |
| | | | | 726/25 |

* cited by examiner

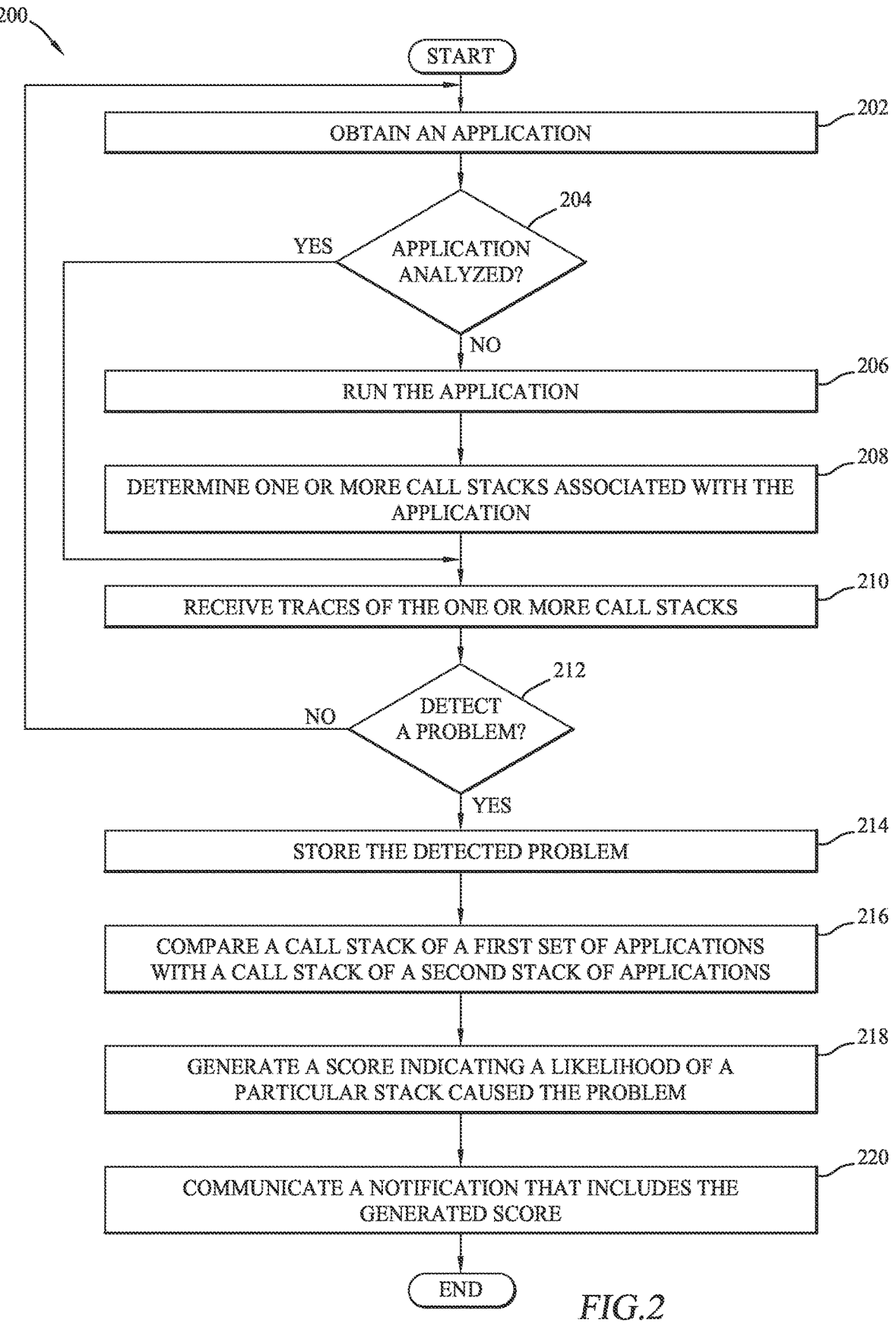

200

START

OBTAIN AN APPLICATION — 202

204
APPLICATION ANALYZED?

YES

NO

RUN THE APPLICATION — 206

DETERMINE ONE OR MORE CALL STACKS ASSOCIATED WITH THE APPLICATION — 208

RECEIVE TRACES OF THE ONE OR MORE CALL STACKS — 210

212
DETECT A PROBLEM?

NO

YES

STORE THE DETECTED PROBLEM — 214

COMPARE A CALL STACK OF A FIRST SET OF APPLICATIONS WITH A CALL STACK OF A SECOND STACK OF APPLICATIONS — 216

GENERATE A SCORE INDICATING A LIKELIHOOD OF A PARTICULAR STACK CAUSED THE PROBLEM — 218

COMMUNICATE A NOTIFICATION THAT INCLUDES THE GENERATED SCORE — 220

END

FIG.2

APPLICATION VULNERABILITY SCORE BASED ON STACK TRACES

RELATED APPLICATIONS

This application claims priority to U.S. Patent Application No. 63/308,681, filed Feb. 10, 2022, which is hereby incorporated by reference in its entirety.

TECHNICAL FIELD

Certain embodiments relate, in general, to application security. More specifically, certain embodiments relate to an application vulnerability score based on stack traces.

BACKGROUND

In general, application security may provide security for a software application. For example, application security may involve finding, fixing, and/or preventing security vulnerabilities that may otherwise leave an application open to exploitation. Application security may be provided at any suitable point in the life cycle of the application, such as at requirements analysis, design, implementation, verification, and/or maintenance.

BRIEF DESCRIPTION OF THE DRAWINGS

FIG. 2 illustrates an example flowchart for detecting vulnerabilities in applications by evaluating call traces and scoring the severity of the vulnerabilities, in accordance with certain embodiments.

DESCRIPTION OF EXAMPLE EMBODIMENTS

Overview

Figure 1:
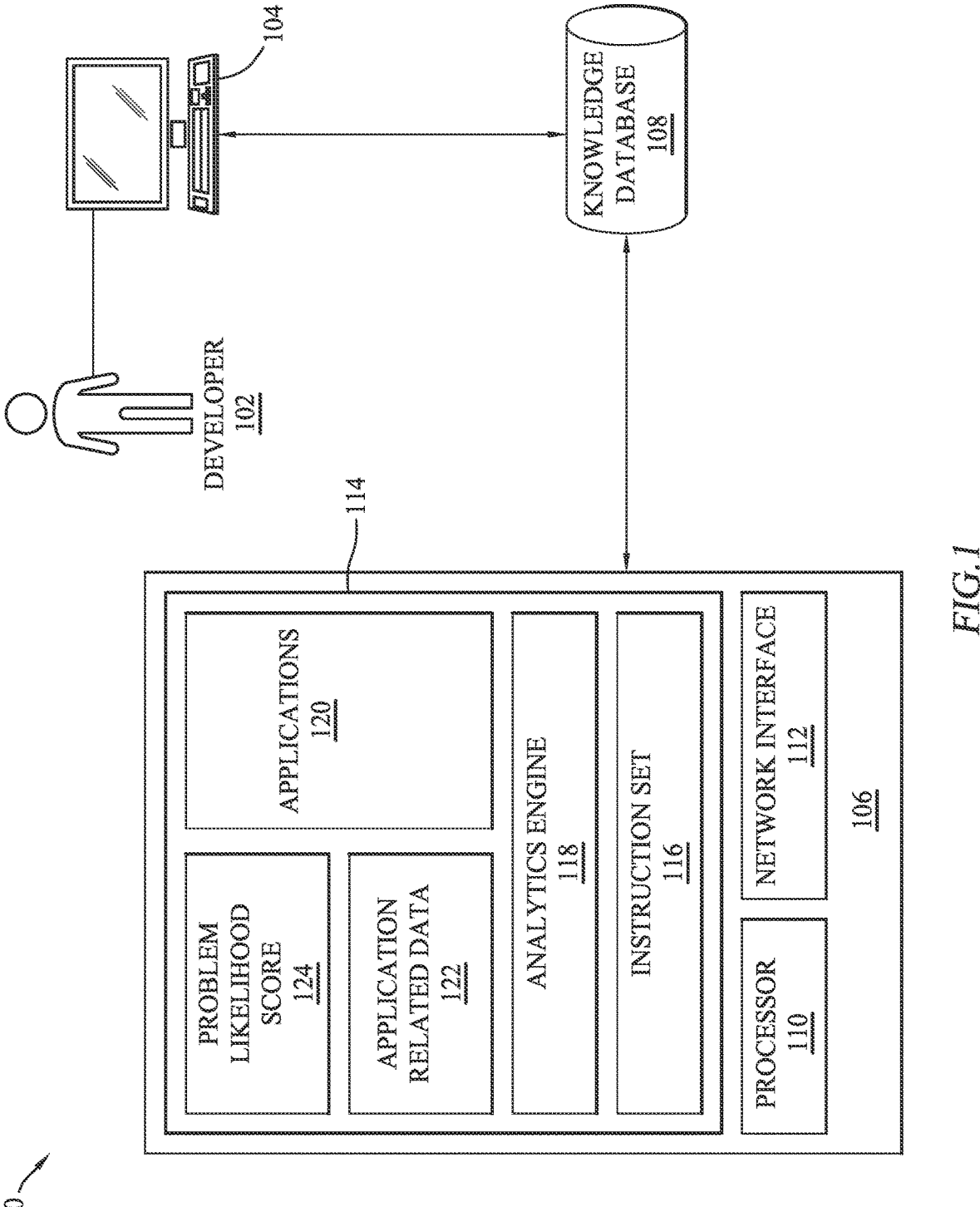
FIG. 1 illustrates an example of a system for detecting vulnerabilities in applications by evaluating call traces and scoring the severity of the vulnerabilities, in accordance with certain embodiments.

According to an embodiment, a computing system comprises one or more processors and one or more computer-readable non-transitory storage media comprising instructions that, when executed by the one or more processors, cause one or more components of the computing system to perform operations. The operations include determining one or more call stacks associated with an application, determining whether a problem occurs in the application, comparing a call stack of a first set of applications with a call stack of a second set of applications, and generating a score indicating a likelihood that a particular call stack caused the problem. In some cases, the call stack of the first set of applications includes the problem and the call stack of the second set of applications does not include the problem.

In certain embodiments, the operations include generating a notification comprising the score. The score indicates the likelihood that the particular call stack caused the problem. The application may be instantiated in a development environment and the notification sent prior to execution of the application. Additionally, the operations may include receiving traces of the call stack of the first set of applications to determine whether the problem occurs in the application. The problem may include one of a known vulnerability, a known weakness, and both a known vulnerability and a known weakness. Furthermore, generating a score indicates a likelihood that a particular call stack caused the problem. In addition, generating the score indicating the likelihood that the particular call stack has the problem can be based on whether the particular call stack is included in one of the call stack of the first set of applications, the call stack of the second set of applications, or both call stacks of the first and second sets of applications. In some embodiments, the operations include storing known application vulnerabilities and associated applications, call stacks, system calls, application versions, call stack versions, and call iterations in a knowledge database. The operations further include training a machine learning algorithmic model using, at least in part, a test data set, the test data set derived from the known application vulnerabilities and call stacks associated with the known application vulnerabilities.

According to another embodiment, a method performed by a computing system includes determining one or more call stacks associated with an application, determining whether a problem occurs in the application, comparing a call stack of a first set of applications with a call stack of a second set of applications, and generating a score indicating a likelihood that a particular call stack caused the problem. In some cases, the call stack of the first set of applications includes the problem and the call stack of the second set of applications does not include the problem.

In certain embodiments, the method further includes generating a notification including the score indicating the likelihood that the particular call stack caused the problem. The application may be instantiated in a development environment and the notification sent prior to execution of the application. In some embodiments, the method further includes receiving traces of the call stack of the first set of applications to determine whether the problem occurs in the application. The problem may include one of a known vulnerability, a known weakness, and both a known vulnerability and a known weakness. In addition, generating the score indicating the likelihood that the particular call stack has the problem may be based on whether the particular call stack is included in one of the call stack of the first set of applications, the call stack of the second set of applications, or both call stacks of the first and second sets of applications. In yet other embodiments, the method further includes storing known application vulnerabilities and associated applications, call stacks, system calls, application versions, call stack versions, and call iterations in a knowledge database. The method may also include training a machine learning algorithmic model using, at least in part, a test data set, the test data set derived from the known application vulnerabilities and call stacks associated with the known application vulnerabilities.

According to yet another embodiment, one or more computer-readable non-transitory storage media may embody instructions that, when executed by a processor of a computing system, cause the performance of operations of determining one or more call stacks associated with an application, determining whether a problem occurs in the application, comparing a call stack of a first set of applications with a call stack of a second set of applications, and generating a score indicating a likelihood that a particular call stack caused the problem. In some cases, the call stack of the first set of applications includes the problem and the call stack of the second set of applications does not include the problem.

In certain embodiments, the instructions cause the performance of further operations including generating a notification that includes the score indicating the likelihood that the particular call stack caused the problem. In addition, the application may be instantiated in a development environment and the notification sent prior to execution of the application. In some embodiments, the instructions cause the performance of further operations comprising receiving traces of the call stack of the first set of applications to determine whether the problem occurs in the application. The problem may include one of a known vulnerability, a known weakness, and both a known vulnerability and a known weakness. In addition, generating the score indicating the likelihood that the particular call stack has the problem may be based on whether the particular call stack is included in the call stack of the first set of applications, the call stack of the second set of applications, or both call stacks of the first and second sets of applications. In yet other embodiments, the instructions cause the performance of further operations comprising storing known application vulnerabilities and associated applications, call stacks, system calls, application versions, call stack versions, and call iterations in a knowledge database. The instructions may also cause the performance of further operations comprising training a machine learning algorithmic model using, at least in part, a test data set, the test data set derived from the known application vulnerabilities and call stacks associated with the known application vulnerabilities.

Technical advantages of certain embodiments of this disclosure may include one or more of the following. Certain embodiments provide a score for application vulnerabilities based on stack traces. Certain embodiments provide information about a type of vulnerability (such as an SQL injection vulnerability, for example), a location of the vulnerability (e.g., which stack(s) have a high likelihood of being the cause of the vulnerability), and/or a severity of the vulnerability. Certain embodiments facilitate remediating the vulnerability, for example, by reporting the vulnerability to a developer or by applying one or more rules to automatically remedy the vulnerability. In this manner, certain embodiments may allow for improving security at the application level, for example, in order to protect against attacks, slowdowns, or other security vulnerabilities. Certain embodiments may facilitate maximizing speed and uptime while balancing risk through prevention, detection, and/or remediation of security vulnerabilities.

Other technical advantages will be readily apparent to one skilled in the art from the following figures, descriptions, and claims. Moreover, while specific advantages have been enumerated above, various embodiments may include all, some, or none of the enumerated advantages.

Example Embodiments

FIG. 1 illustrates an example of a system for detecting vulnerabilities in applications by evaluating call traces and scoring the severity of the vulnerabilities, according to certain embodiments, denoted generally as system 100. System 100 comprises a developer 102, terminal 104, application server 106, and a knowledge database 108. Terminal 104 is communicatively coupled to application server 106, and application server 106 is communicatively coupled to knowledge database 108. Application server 106 comprises a processor 110, a network interface 112, and a memory 114. Memory 114 comprises instruction set 116, analytics engine 118, a plurality of applications 120, application related data 122, and a problem likelihood score 124.

Software vulnerabilities may expose software to a security risk. Many software vulnerabilities result from careless programming. For example, Structured Query Language (SQL) injection vulnerability may occur if an SQL query is built directly using unreliable text, such as unreliable text entered by a user. This SQL injection vulnerability could be avoided by making a parameterized SQL call, rather than building the SQL query and calling it directly. In a parameterized SQL call, a query template and parameters are sent separately.

There are many applications and operating system distribution sources that include data repositories of known computer viruses, related applications, and related application data. One or more of these distribution repositories may provide a feed of known vulnerabilities or otherwise provide access to the known vulnerabilities, predicted probabilities (likelihoods), scores, associated applications, and associated application related data. Additionally, these distribution sources may provide access to machine learning algorithmic models capable of processing application data and identifying application vulnerabilities.

Certain embodiments of the present disclosure may provide solutions for mitigating software vulnerabilities. For example, software vulnerabilities may have varying levels of import in security analysis. Certain embodiments of the present disclosure determine the importance of a vulnerability or the potential impact of a vulnerability in order to improve application security. For example, the importance of a vulnerability may be used to determine which security measure(s) to implement in order to reduce or eliminate a risk associated with the vulnerability.

Certain embodiments use a machine learning model to score a call stack for a vulnerability and the machine learning model is also used to detect vulnerabilities in new applications.

Developer 102 represents any suitable entity that writes software for the purpose of causing one or more computers to perform one or more tasks in rendering a service. More succinctly, developer 102 may write software instructions for the purpose of developing, testing, validating and repairing software applications.

Terminal 104 represents a graphics display and data entry device configured to interface with application server 106 and display visualizations generated by application server 106. For example, developer 102 may enter software instructions for instruction set 116 using a keyboard and an emacs editor, executing on application server 106, and application server 106 causes the software instructions and graphics generated by the emacs editor to be visually displayed on a computer monitor.

Application server 106 represents any suitable operating system configurable to process data and interface with various hardware and associated software components described herein. Application server 106 represents any suitable operating system configurable to operate as a client and server and perform standard operating system and client and server functionality. Application server 106 also represents any suitable operating system configurable with applications necessary for development and production of software applications. In addition, application server 106 represents any suitable operating system configurable to operate instruction set 116 and perform the various functions and features associated therewith.

In an embodiment, application server 106 may be configured to store machine learning algorithmic models, known application vulnerabilities, predicted probabilities (likelihoods), scores and associated applications (including applications 120) and application related data (including application related data 122). Application server 106 may be configured to process the feed, access the one or more repositories, access machine learning algorithmic models, or any combination thereof and store the same in the knowledge database 108.

Knowledge database 108 represents any suitable database operating system and storage facility. The database operating system comprises various known operating systems, database functions, and attributes configurable to communicate with application server 106 and other networked device, process database commands for the purpose of storing data in the storage facility in structured formats or in unstructured formats, communicate data using various communication protocols, and execute mathematical formulas including advanced formulas relating to analytics.

Processor 110 represents any suitable hardware, software, or both hardware and software components capable of processing data provided network interface 112, memory 114, instruction set 116, and supporting software, such as that found in any commercially available or open source operating system.

Network interface 112 represents any suitable hardware, software, or both hardware and software components capable of communicating data generated by processor 110 and interfacing with memory 114 and knowledge database 108.

Memory 114 represents any suitable hardware, software, or both hardware and software components capable of storing data generated by processor 110. In the illustrated embodiments, memory 114 includes instruction set 116, analytics engine 118, applications 120, application related data 122, and problem likelihood score 124.

Instruction set 116 represents software code and an interpreter configurable to process data and interface data with processor 110, network interface 112, memory 114, and analytics engine 118. Instruction set 116 may be written in an interpretive language and comprises various commands, functions, and data structures used in performing various functions described herein.

Analytics engine 118 may build a supervised or unsupervised machine learning algorithmic model using an applicable algorithm and one or more data sets from knowledge database 108 to train the algorithm. The trained machine learning algorithmic model comprises a variable space determined by patterns detected during the training of the applicable algorithm. The applicable algorithm may be any algorithm, e.g., linear regression, suitable for building a model based on the intended application of identifying a vulnerability in application logic.

Application server 106 or analytics engine 118 may also access pre-built machine learning algorithmic models through one of the repositories for use in evaluating applications 120. Common Vulnerability Enumeration (CVE) model and Common Weakness Enumeration (CWE) model are two publicly available models that may be used by analytics engine 118 to identify vulnerabilities in applications 120. Application server 106 may be configured to process the feed, access the one or more repositories, access machine learning algorithmic models, or any combination thereof and store the same in knowledge database 108.

Applications 120 may include any applications associated with an operating system, such as user-space applications and libraries as well as kernel-based applications and libraries. Applications 120 may include unpublished (not in circulation or in a source distribution) applications, currently in development applications, and published applications. Application related data 122 may include call stacks, system calls, application versions, call stack versions, call iterations, or any combination of the call stacks, system calls, application versions, call stack versions, and call iterations.

Problem likelihood score 124 may be a product of a ratio that represents a probability for which a predictor variable is likely. More succinctly, problem likelihood score 124 represents a value that may be used to indicate whether an application and one of its subroutines comprises software code that may be faulty and, therefore, vulnerable to being exploited.

In an exemplary embodiment of operation, developer 102 may instantiate applications 120 in a development environment of a software tool and execute analytics engine 118. Each application instantiation comprises one or more system call stacks with each call stack comprising one or more subroutines. Developer 102 may run the subroutines by stepping through the applications and applying test data as input. Application related data 122 is generated during this process. As the process of stepping through the subroutines occurs, analytics engine 118 evaluates application related data 122. Analytics engine 118 harvests variables from application related data 122, populates the variable space of the trained machine learning algorithmic model, and executes the algorithmic model against a sample of knowledge database 108 to determine probabilities and scores of each system call, each subroutine, each call stack, or any combination thereof. Applications 120, application related data 122, probabilities, scores, or any combination thereof generated during this process may be stored in knowledge database 108.

Application server 106 may generate a notification comprising the determined probability and scores and send the notification to developer 102. It should be understood that the functionality of analytics engine 118 described with respect to the practical application also applies in a production environment. However, analytics engine 118 or application server 106 may disable any application prior to execution upon the event a vulnerability in a call stack is identified.

Although FIG. 1 illustrates a particular number of developers 102, terminals 104, application servers 106, and knowledge databases 108, this disclosure contemplates any suitable number of developers 102, terminals 104, application servers 106, and knowledge databases 108. Additionally, this disclosure contemplates any suitable arrangement of developers 102, terminals 104, application servers 106, and knowledge databases 108. Additionally, this disclosure contemplates any suitable combination of any suitable components, devices, or systems carrying out any suitable actions.

FIG. 2 illustrates an example flowchart for detecting vulnerabilities in applications by evaluating call traces and scoring the severity of the vulnerabilities, in accordance with certain embodiments, denoted generally as 200. The flowchart begins at step 202 where the plurality of applications 120 are obtained, e.g., through network interface 112, stored in memory 114, and instantiated in memory 114 by processor 110 of application server 106. As an example, the plurality of applications 120 comprise App1 (such as version 1 of an application) and App2 (such as version 2 of the application) with each application comprising one or more call stacks and with each call stack comprising one or more subroutines. It should be understood that a call stack represents a data structure and the data structure may be populated with information about the subroutines.

At step 204, flowchart 200 determines if applications 120 have been analyzed. If the applications 120 have not been analyzed, the subroutines in the call stacks of the instantiated applications 120 are ran in a step-by-step manner, generating application related data 122 in the process, at step 206. At step 208, flowchart 200 evaluates the application related data 122 to determine one or more call stacks and the applications 120.

If applications 120 have been analyzed, as determined in step 204, or one or more call stacks have been determined in step 208, the method continues at step 210 where traces of the one or more call stacks are received by analytics engine 118. Analytics engine 118 evaluates the traces using the algorithmic machine learning model, application related data 122, and the knowledge database 108 to determine a problem (e.g., a vulnerability and/or weakness).

At step 212, flowchart 200 determines if a problem was detected in step 210. A problem may include a vulnerability, a weakness, a vulnerability score, the application subroutine, and/or an identifier. At step 214, the detected problem is stored in knowledge database 108. At step 216, analytics engine 118 compares a call stack of a first set of applications with a call stack of a second set of applications. At step 218, analytics engine 118 generates a score indicating a likelihood a particular stack caused the problem. For example, analytics engine 118 populates a parameter space of the machine learning algorithmic model with variables from one or more sets of applications and applies the model to a sample data set from knowledge database 108 in order to generate a probability and score. At step 220, application server 106 generates a notification of the problem and the score and communicates the notification to one or more recipients.

Although the previous example describes running the method for a plurality of applications, other embodiments may run the method on one application in a number of environments or under a number of conditions in order to determine which stack(s) are likely sources of a vulnerability. For example, a stack that is present in environments/conditions for which the vulnerability is detected and is absent in environments/conditions for which the vulnerability is not detected may be assigned a score indicating a high likelihood that the stack is the cause of the vulnerability. Additionally, this disclosure contemplates any suitable flowchart 200 for a method for detecting vulnerabilities in applications by evaluating call traces and scoring the severity of the vulnerabilities, including any suitable steps, which may include all, some, or none of the steps of the flowchart of FIG. 2, where appropriate. Although this disclosure describes and illustrates particular steps of flowchart 200 of FIG. 2 as occurring in a particular order, this disclosure contemplates any suitable steps of flowchart 200 of FIG. 2 occurring in any suitable order. Although this disclosure describes and illustrates particular components, devices, or systems carrying out particular steps of flowchart 200 of FIG. 2, this disclosure contemplates any suitable combination of any suitable components, devices, or systems carrying out any suitable steps of flowchart 200 of FIG. 2.

Figure 3:
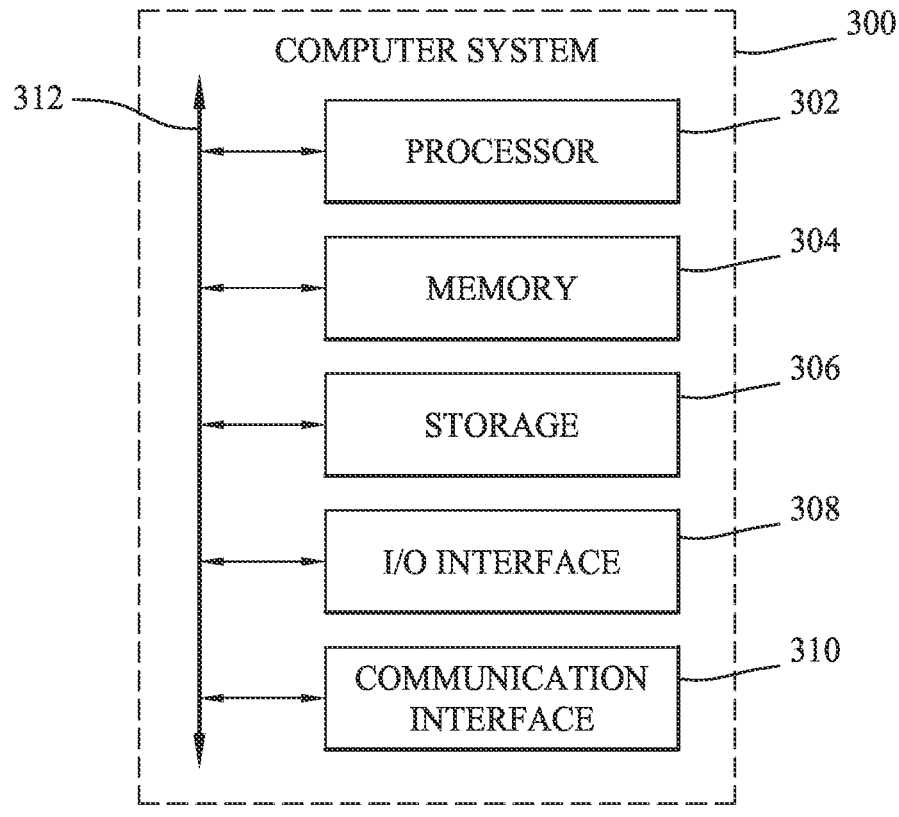
FIG. 3 illustrates an example of a computer system, in accordance with certain embodiments.

FIG. 3 illustrates an example of a computer system 300, which may be used by the systems and methods described herein. In particular embodiments, computer system 300 provides functionality described or illustrated herein. As an example, computer system 300 may be used to perform one or more steps described with respect to FIGS. 1 and 2. In particular embodiments, software running on computer system 300 provides functionality described or illustrated herein or performs one or more steps of one or more methods described or illustrated herein. Particular embodiments include computer system 300. Herein, reference to a computer system may encompass a computing device, and vice versa, where appropriate. Moreover, reference to a computer system may encompass one or more computer systems, where appropriate.

This disclosure contemplates any suitable number of computer system 300. This disclosure contemplates computer system 300 taking any suitable physical form. As example and not by way of limitation, computer system 300 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 300 may include one or more computer system 300; be unitary or distributed; span multiple locations; span multiple machines; span multiple data centers; or reside in a cloud, which may include one or more cloud components in one or more networks. Where appropriate, one or more computer system 300 may perform without substantial spatial or temporal limitation one or more steps of one or more methods described or illustrated herein. As an example and not by way of limitation, one or more computer system 300 may perform in real time or in batch mode one or more steps of one or more methods described or illustrated herein. One or more computer systems 300 may perform at different times or at different locations one or more steps of one or more methods described or illustrated herein, where appropriate.

In particular embodiments, computer system 300 includes a processor 302, memory 304, storage 306, an input/output (I/O) interface 308, a communication interface 310, and a bus 312. Although this disclosure describes and illustrates a particular computer system having a particular number of particular components in a particular arrangement, this disclosure contemplates any suitable computer system having any suitable number of any suitable components in any suitable arrangement.

In particular embodiments, processor 302 includes hardware for executing instructions, such as those making up a computer program. As an example and not by way of limitation, to execute instructions, processor 302 may retrieve (or fetch) the instructions from an internal register, an internal cache, memory 304, or storage 306; decode and execute them; and then write one or more results to an internal register, an internal cache, memory 304, or storage 306. In particular embodiments, processor 302 may include one or more internal caches for data, instructions, or addresses. This disclosure contemplates processor 302 including any suitable number of any suitable internal caches, where appropriate. As an example, and not by way of limitation, processor 302 may include one or more instruction caches, one or more data caches, and one or more translation lookaside buffers (TLBs). Instructions in the instruction caches may be copies of instructions in memory 304 or storage 306, and the instruction caches may speed up retrieval of those instructions by processor 302. Data in the data caches may be copies of data in memory 304 or storage 306 for instructions executing at processor 302 to operate on; the results of previous instructions executed at processor 302 for access by subsequent instructions executing at processor 302 or for writing to memory 304 or storage 306; or other suitable data. The data caches may speed up read or write operations by processor 302. The TLBs may speed up virtual-address translation for processor 302. In particular embodiments, processor 302 may include one or more internal registers for data, instructions, or addresses. This disclosure contemplates processor 302 including any suitable number of any suitable internal registers, where appropriate. Where appropriate, processor 302 may include one or more arithmetic logic units (ALUs); be a multi-core processor; or include one or more processors 302. Although this disclosure describes and illustrates a particular processor, this disclosure contemplates any suitable processor.

In particular embodiments, memory 304 includes main memory for storing instructions for processor 302 to execute or data for processor 302 to operate on. As an example and not by way of limitation, computer system 300 may load instructions from storage 306 or another source (such as, for example, another computer system 300) to memory 304. Processor 302 may then load the instructions from memory 304 to an internal register or internal cache. To execute the instructions, processor 302 may retrieve the instructions from the internal register or internal cache and decode them. During or after execution of the instructions, processor 302 may write one or more results (which may be intermediate or final results) to the internal register or internal cache. Processor 302 may then write one or more of those results to memory 304. In particular embodiments, processor 302 executes only instructions in one or more internal registers or internal caches or in memory 304 (as opposed to storage 306 or elsewhere) and operates only on data in one or more internal registers or internal caches or in memory 304 (as opposed to storage 306 or elsewhere). One or more memory buses (which may each include an address bus and a data bus) may couple processor 302 to memory 304. Bus 312 may include one or more memory buses, as described below. In particular embodiments, one or more memory management units (MMUs) reside between processor 302 and memory 304 and facilitate accesses to memory 304 requested by processor 302. In particular embodiments, memory 304 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 304 may include one or more memories 304, where appropriate. Although this disclosure describes and illustrates particular memory, this disclosure contemplates any suitable memory.

In particular embodiments, storage 306 includes mass storage for data or instructions. As an example and not by way of limitation, storage 306 may include a hard disk drive (HDD), a floppy disk drive, flash memory, an optical disc, a magneto-optical disc, magnetic tape, or a Universal Serial Bus (USB) drive or a combination of two or more of these. Storage 306 may include removable or non-removable (or fixed) media, where appropriate. Storage 306 may be internal or external to computer system 300, where appropriate. In particular embodiments, storage 306 is non-volatile, solid-state memory. In particular embodiments, storage 306 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 306 taking any suitable physical form. Storage 306 may include one or more storage control units facilitating communication between processor 302 and storage 306, where appropriate. Where appropriate, storage 306 may include one or more storages 306. Although this disclosure describes and illustrates particular storage, this disclosure contemplates any suitable storage.

In particular embodiments, I/O interface 308 includes hardware, software, or both, providing one or more interfaces for communication between computer system 300 and one or more I/O devices. Computer system 300 may include one or more of these I/O devices, where appropriate. One or more of these I/O devices may enable communication between a person and computer system 300. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 308 for them. Where appropriate, I/O interface 308 may include one or more device or software drivers enabling processor 302 to drive one or more of these I/O devices. I/O interface 308 may include one or more I/O interfaces 308, where appropriate. Although this disclosure describes and illustrates a particular I/O interface, this disclosure contemplates any suitable I/O interface.

In particular embodiments, communication interface 310 includes hardware, software, or both providing one or more interfaces for communication (such as, for example, packet-based communication) between computer system 300 and one or more other computer systems 300 or one or more networks. As an example and not by way of limitation, communication interface 310 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 310 for it. As an example and not by way of limitation, computer system 300 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 300 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. Computer system 300 may include any suitable communication interface 310 for any of these networks, where appropriate. Communication interface 310 may include one or more communication interfaces 310, where appropriate. Although this disclosure describes and illustrates a particular communication interface, this disclosure contemplates any suitable communication interface.

In particular embodiments, bus 312 includes hardware, software, or both coupling components of computer system 300 to each other. As an example and not by way of limitation, bus 312 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 312 may include one or more buses 312, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Additionally, although this disclosure describes or illustrates particular embodiments as providing particular advantages, particular embodiments may provide none, some, or all of these advantages.

The embodiments disclosed herein are only examples, and the scope of this disclosure is not limited to them. Particular embodiments may include all, some, or none of the components, elements, features, functions, operations, or steps of the embodiments disclosed herein.

Modifications, additions, or omissions may be made to the elements shown in the figure above. The components of a device may be integrated or separated. Moreover, the functionality of a device may be performed by more, fewer, or other components. The components within a device may be communicatively coupled in any suitable manner. Functionality described herein may be performed by one device or distributed across multiple devices. In general, systems and/or components described in this disclosure as performing certain functionality may comprise non-transitory computer readable memory storing instructions and processing circuitry operable to execute the instructions to cause the system/component to perform the described functionality.

While several embodiments have been provided in the present disclosure, it should be understood that the disclosed systems and methods might be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry configured to execute program code stored in memory. The term unit may have conventional meaning in the field of electronics, electrical devices and/or electronic devices and may include, for example, electrical and/or electronic circuitry, devices, modules, processors, receivers, transmitters, memories, logic solid state and/or discrete devices, computer programs or instructions for carrying out respective tasks, procedures, computations, outputs, and/or displaying functions, and so on, as such as those that are described herein.

What is claimed is:

1. A computing system, the computing system comprising:

one or more processors; and one or more computer-readable non-transitory storage media comprising instructions that, when executed by the one or more processors, cause one or more components of the computing system to perform operations comprising:

training a machine learning model with a first set of call stacks associated with a first application, wherein the first application causes a problem;

training the machine learning model with a second set of call stacks associated with a second application, wherein the second application does not cause the problem;

using the trained machine learning model to generate a problem likelihood score for a first call stack of the first set of call stacks, wherein the problem likelihood score indicates a predicted probability that the first call stack caused the problem;

determining one or more call stacks associated with a new application;

determining whether the problem occurs in the new application;

comparing, in response to determining that the problem occurs, the one or more call stacks associated with the new application to the first call stack; and generating a score indicating a likelihood that the first call stack caused the problem in the new application.

2. The computing system of claim 1, wherein the instructions cause the one or more components of the computing system to perform further operations comprising generating a notification comprising the score indicating the likelihood that the first call stack caused the problem.

3. The computing system of claim 2, wherein:

the new application is instantiated in a development environment; and the notification is sent prior to execution of the new application.

4. The computing system of claim 1, wherein the instructions cause the one or more components of the computing system to perform further operations comprising receiving traces of the one or more call stacks of the new application to determine whether the problem occurs in the new application.

5. The computing system of claim 1, wherein the problem includes one of a known vulnerability, a known weakness, and both a known vulnerability and a known weakness.

6. The computing system of claim 1, wherein the instructions cause the one or more components of the computing system to perform further operations comprising:

storing known application vulnerabilities and associated applications, call stacks, system calls, application versions, call stack versions, and call iterations in a knowledge database; and further training the machine learning model using, at least in part, a test data set, the test data set derived from the known application vulnerabilities and the call stacks associated with the known application vulnerabilities.

7. The computing system of claim 1, wherein generating the score indicating the likelihood that the first call stack caused the problem in the new application is based on whether the first call stack is included in the new application.

8. A method performed by a computing system, the method comprising:

training a machine learning model with a first set of call stacks associated with a first application, wherein the first application causes a problem;

training the machine learning model with a second set of call stacks associated with a second application, wherein the second application does not cause the problem;

using the trained machine learning model to generate a problem likelihood score for a first call stack of the first set of call stacks, wherein the problem likelihood score indicates a predicted probability that the first call stack caused the problem;

determining one or more call stacks associated with a new application;

determining whether the problem occurs in the new application;

comparing, in response to determining that the problem occurs, the one or more call stacks associated with the new application to the first call stack; and generating a score indicating a likelihood that the first call stack caused the problem in the new application.

9. The method of claim 8, further comprising generating a notification comprising the score indicating the likelihood that the first call stack caused the problem.

10. The method of claim 9, wherein:

The new application is instantiated in a development environment; and the notification is sent prior to execution of the new application.

11. The method of claim 8, further comprising receiving traces of the one or more call stacks of the new application to determine whether the problem occurs in the new application.

12. The method of claim 8, wherein the problem includes one of a known vulnerability, a known weakness, and both a known vulnerability and a known weakness.

13. The method of claim 8, further comprising:

storing known application vulnerabilities and associated applications, call stacks, system calls, application versions, call stack versions, and call iterations in a knowledge database; and further training the machine learning model using, at least in part, a test data set, the test data set derived from the known application vulnerabilities and the call stacks associated with the known application vulnerabilities.

14. The method of claim 8, wherein generating the score indicating the likelihood that the first call stack caused the problem in the new application is based on whether the first call stack is included in the new application.

15. One or more computer-readable non-transitory storage media embodying instructions that, when executed by a processor of a computing system, cause performance of operations comprising:

training a machine learning model with a first set of call stacks associated with a first application, wherein the first application causes a problem;

training the machine learning model with a second set of call stacks associated with a second application, wherein the second application does not cause the problem;

using the trained machine learning model to generate a problem likelihood score for a first call stack of the first set of call stacks, wherein the problem likelihood score indicates a predicted probability that the first call stack caused the problem;

determining one or more call stacks associated with a new application;

determining whether the problem occurs in the new application;

comparing, in response to determining that the problem occurs, the one or more call stacks associated with the new application to the first call stack; and generating a score indicating a likelihood that the first call stack caused the problem in the new application.

16. The one or more computer-readable non-transitory storage media of claim 15, wherein the instructions cause the performance of further operations comprising generating a notification comprising the score indicating the likelihood that the first call stack caused the problem.

17. The one or more computer-readable non-transitory storage media of claim 16, wherein:

the new application is instantiated in a development environment; and the notification is sent prior to execution of the new application.

18. The one or more computer-readable non-transitory storage media of claim 15, wherein the problem includes one of a known vulnerability, a known weakness, and both a known vulnerability and a known weakness.

19. The one or more computer-readable non-transitory storage media of claim 15, wherein generating the score indicating the likelihood that the first call stack caused the problem in the new application is based on whether the first call stack is included in the new application.

20. The one or more computer-readable non-transitory storage media of claim 15, the operations further comprising:

storing known application vulnerabilities and associated applications, call stacks, system calls, application versions, call stack versions, and call iterations in a knowledge database; and further training the machine learning model using, at least in part, a test data set, the test data set derived from the known application vulnerabilities and the call stacks associated with the known application vulnerabilities.

\* \* \* \* \*